(12) United States Patent
Hardy et al.

(10) Patent No.: US 7,513,562 B2
(45) Date of Patent: Apr. 7, 2009

(54) MECHANISM TO ATTACH AND TO RAISE A TONNEAU COVER

(75) Inventors: Stephen C. Hardy, Holiday, FL (US); Richard W. Mahoney, Largo, FL (US)

(73) Assignee: Tech-Craft, Inc., Holiday, FL (US)

( * ) Notice: Subject to any disclaimer, the term of this patent is extended or adjusted under 35 U.S.C. 154(b) by 205 days.

(21) Appl. No.: 11/600,508

(22) Filed: Nov. 16, 2006

(65) Prior Publication Data

US 2008/0116708 A1  May 22, 2008

(51) Int. Cl.
B60P 7/02 (2006.01)
(52) U.S. Cl. ............... 296/100.06; 49/246; 296/100.1
(58) Field of Classification Search ............ 49/246, 49/386, 387; 248/292.11, 631; 296/100.02, 296/100.06, 100.07, 100.08, 100.1
See application file for complete search history.

(56) References Cited

U.S. PATENT DOCUMENTS

| | | | | | |
|---|---|---|---|---|---|
| 3,155,423 | A | * | 11/1964 | Cripe | 296/100.08 |
| 3,649,073 | A | * | 3/1972 | Whittemore | 296/100.08 |
| 3,765,716 | A | * | 10/1973 | Van Gompel | 296/100.08 |
| 4,083,596 | A | * | 4/1978 | Robertson | 296/100.1 |
| 4,613,181 | A | | 9/1986 | Rafi-Zadeh | |
| 4,673,209 | A | | 6/1987 | Rafi-Zadeh | |
| 4,856,841 | A | * | 8/1989 | Rafi-Zadeh | 296/100.08 |
| 5,002,329 | A | * | 3/1991 | Rafi-Zadeh | 296/100.08 |
| 5,203,364 | A | * | 4/1993 | Koole | 135/148 |
| 5,364,154 | A | * | 11/1994 | Kaiser | 296/100.07 |
| 5,366,266 | A | * | 11/1994 | Harbison | 296/100.02 |
| 5,375,900 | A | * | 12/1994 | Tessenyi et al. | 296/100.08 |
| 5,951,095 | A | * | 9/1999 | Herndon | 296/165 |
| 5,988,728 | A | | 11/1999 | Lund et al. | |
| 6,086,134 | A | * | 7/2000 | Cravens et al. | 296/100.06 |
| 6,149,220 | A | | 11/2000 | Weldy et al. | |
| 6,209,944 | B1 | * | 4/2001 | Billiu et al. | 296/100.02 |
| 6,227,592 | B1 | * | 5/2001 | Thacker | 296/26.07 |
| 6,273,491 | B1 | | 8/2001 | Bath et al. | |
| 6,435,594 | B1 | | 8/2002 | Ekonen et al. | |

(Continued)

OTHER PUBLICATIONS

Topup camper Aug. 31, 2004 www.topupcamper.com.

*Primary Examiner*—Glenn Dayoan
*Assistant Examiner*—Paul A Chenevert
(74) *Attorney, Agent, or Firm*—Fraser Clemens Martin & Miller LLC; Jacob M. Ward

(57) ABSTRACT

An improved mechanism and method to attach a hard tonneau cover to a vehicle and to raise either just the rear of the cover or raise both the rear and front of the cover. The cover is supported in the raised position by two extending arms in the rear and by two rigid arms in the front. In operation, the rear of the cover is manually raised first and then the front of the cover can be manually raised. One embodiment has clamping telescoping arms for greater strength and to lock the cover in any position. Another embodiment has linear actuators to assist raising the front of the cover. The mechanism is comprised of inexpensively manufactured or off-the-shelf components. It is easily tailored to the numerous vehicle bed sizes, it can handle popular heavy body-colored fiberglass covers and it can be sold and shipped separately from the cover.

23 Claims, 6 Drawing Sheets

U.S. PATENT DOCUMENTS

| | | | |
|---|---|---|---|
| 6,520,558 B1 * | 2/2003 | Katterloher et al. | 296/100.06 |
| 6,572,174 B2 * | 6/2003 | Hernandez et al. | 296/100.09 |
| 6,623,062 B1 | 9/2003 | Hoffman | |
| 6,641,201 B1 | 11/2003 | Pietryga et al. | |
| 6,666,490 B1 * | 12/2003 | Thacker | 296/26.07 |
| 6,702,360 B1 | 3/2004 | Santos | |
| 6,712,418 B1 | 3/2004 | Lathers | |
| 6,751,953 B2 | 6/2004 | Mentink et al. | |
| 6,820,915 B2 * | 11/2004 | Mack et al. | 296/100.08 |
| 6,896,313 B2 * | 5/2005 | Mack et al. | 296/100.08 |
| 7,320,494 B1 * | 1/2008 | Wilson | 296/100.09 |
| 2004/0090081 A1 | 5/2004 | Hoffman | |
| 2004/0164578 A1 | 8/2004 | Mack et al. | |
| 2006/0170239 A1 * | 8/2006 | Altman | 296/100.02 |
| 2006/0244283 A1 * | 11/2006 | Thacker | 296/100.06 |

* cited by examiner

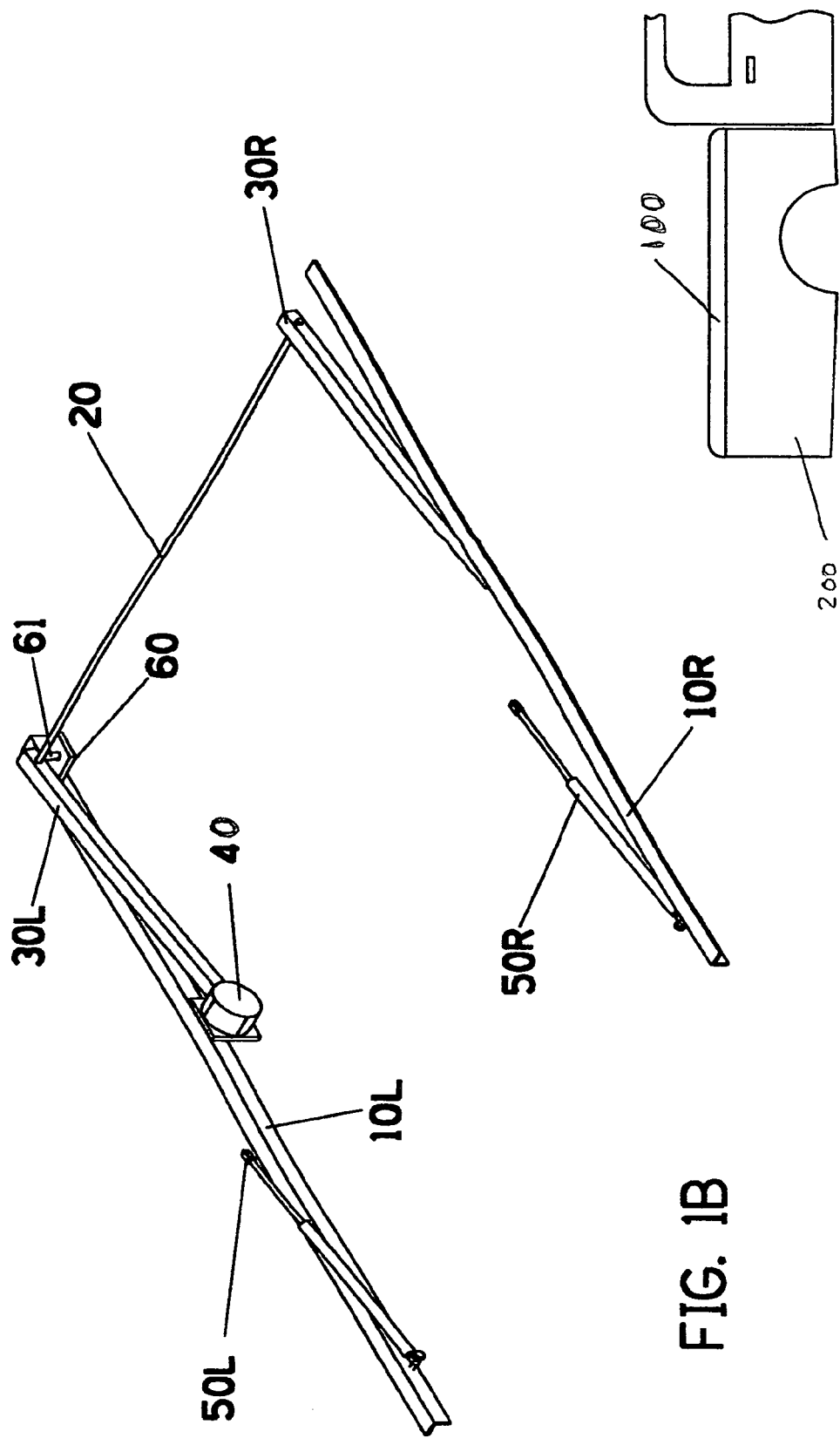

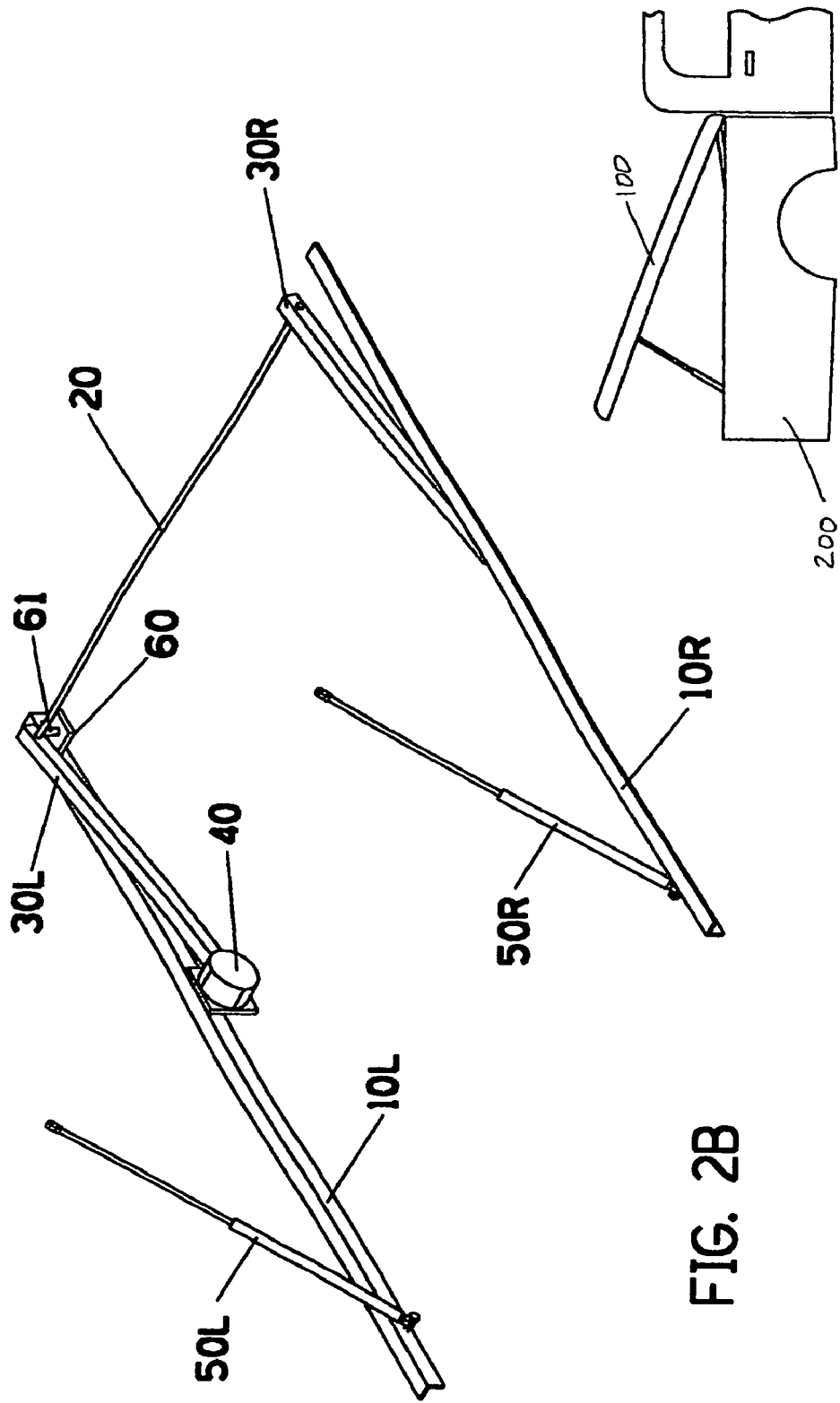

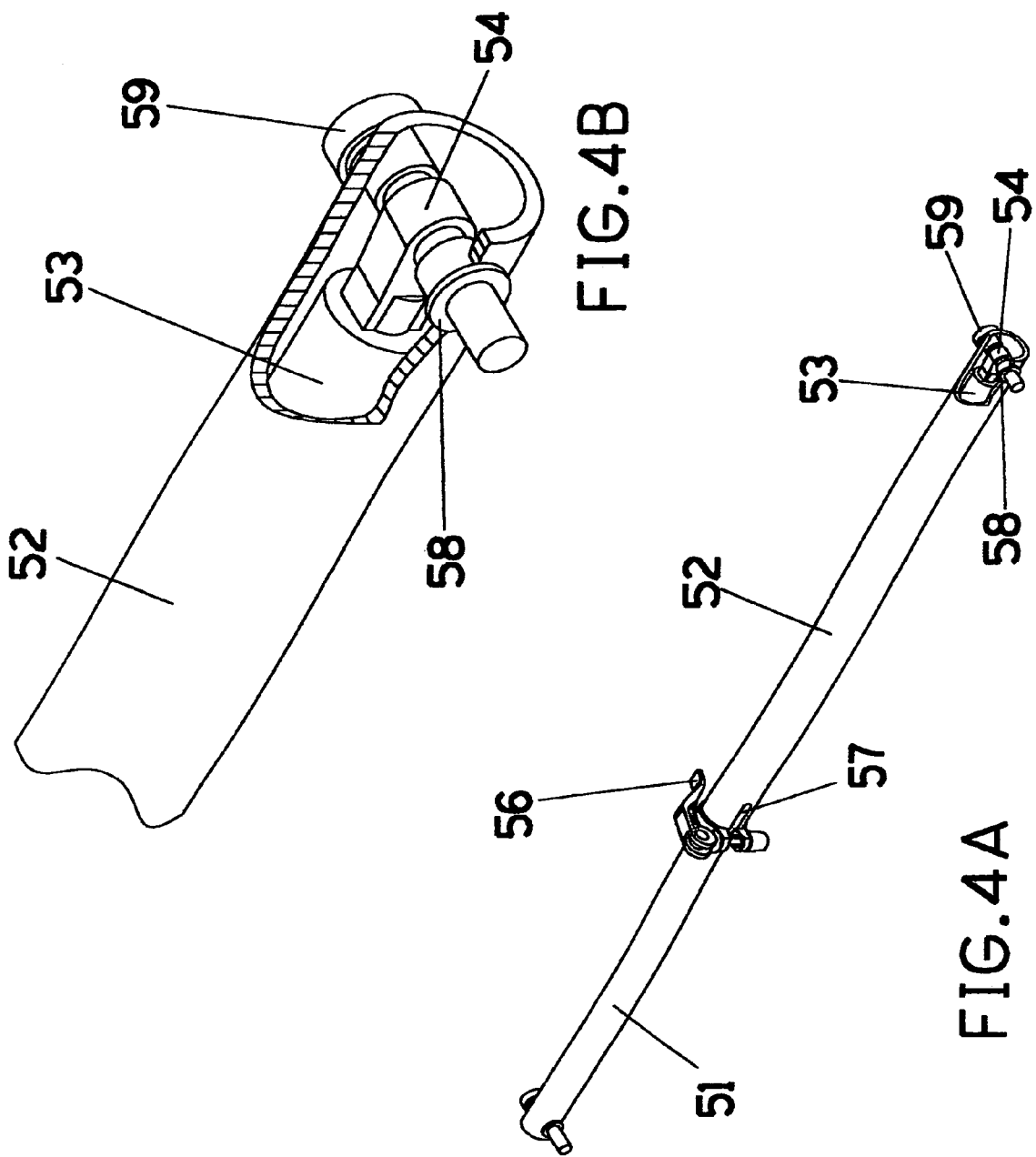

MECHANISM TO ATTACH AND TO RAISE A TONNEAU COVER

CROSS-REFERENCE TO RELATED APPLICATIONS

Not Applicable

FEDERALLY SPONSORED RESEARCH

Not Applicable

THE NAMES OF THE PARTIES TO A JOINT RESEARCH AGREEMENT

Not Applicable

SEQUENCE LISTING

Not Applicable

BACKGROUND OF THE INVENTION

1. Field of the Invention

This invention relates to the field of vehicular tonneau covers, specifically mechanisms for attaching and raising the covers.

2. Prior Art

Pickup trucks have become one of the most popular vehicles, with 3 million new pickups bought each year in the US. Until recently, they were primarily a utilitarian vehicle for farmers and tradesmen. Now pickups are customized with many accessories for recreational use and family use. One of the most popular accessories is a hard tonneau cover that enhances the appearance of the bed, improves fuel economy, and protects the bed contents from weather and from theft.

For many years, hard tonneau covers have been attached to the front of the vehicle bed with a hinge mechanism. At the rear of the cover, a latch or lock mechanism secures the cover in the lowered position. Gas springs attach to the cover and the inside of the bed near the rear of the cover to counteract the cover's weight so that less force is required to raise the rear of the cover and to hold the cover in the raised position.

A major problem with this common attachment system is that it limits access to cargo located at the front of the bed. A second major problem is that it limits the height of the contents of the bed, and prevents items such as large appliances or sofas from being transported without removal of the cover.

A number of inventors have tried to solve these two problems. U.S. Pat. No. 4,613,181 to Raf-Zadeh (1986) and U.S. Pat. No. 4,673,209 to Raf-Zadeh (1987) disclose a complex folding arm at each of 4 corners of a rigid tonneau cover. One deficiency of this invention is that the rear of the tonneau cover cannot be raised by itself, as is common practice with tonneau covers. In addition, easy one-person operation is not possible with described spring-assist mechanism. Another drawback is that the height is not adjustable. A further deficiency is that the mechanism presents insufficient longitudinal restraint to the cover when it is in the raised position and therefore would be dangerous during hard breaking or acceleration.

U.S. Pat. No. 5,988,728 to Lund et al. (1999) discloses a mechanism for hard tonneau covers comprised of side rails that permit cover support brackets to slide thus enabling the cover to slide rearward before the rear edge is raised. Shortcomings of this include that it cannot sufficiently raise the front of the cover to enable good access to cargo and its raised height is not easily adjustable. Furthermore, the disclosed rail-slider mechanism is prone to failure due to sand, dirt and ice or snow. Sealing between bed and cover is also not practical, allowing entry of rain, dirt and ice. The invention is limited in use to vehicles with tapered beds whose owners require hard tonneau cover that fits flush with the topside of the bed for aesthetic reasons.

U.S. Pat. No. 6,712,418 to Lathers (2004) discloses a modular cover assembly comprising rigid side panels, a center panel and support hardware. A significant problem is the tremendous tooling cost and stocking expense of a modular cover assembly that needs to be custom molded for a diverse automotive market which has many models and sizes. The forty two sheets of drawings illustrate the impractical complexity of the disclosed modular cover assembly and lifting mechanism, which often incorporates such costly design features as G-hinges.

The TopUp Corporation claims a U.S. Pat. No. 6,209,994 but discloses a mechanism requiring an electric/hydraulic motor. "X" members attach to the cover on each side of the bed and the rearward ends of the "X" members slide in tracks. A switch causes the electric/hydraulic system to raise the entire cover. The disclosed slider-track mechanism is prone to failure due to sand, dirt and ice or snow and even minor dents in tracks will prevent operation. In addition, the extended X members are inadequate to support the side loads of the hard tonneau cover when driving. All electric operated lift mechanisms face the following problems: the extra cost of an electric/hydraulic system, the extra cost to install and wire electric/hydraulic motor, the loss of cargo space in the bed due to mounting of electric motor/hydraulic pump and cylinders, and the inability to raise the cover due to electric motor/hydraulic pump failure or dead battery. Another problem is that access to cargo is much slower than with manual systems. Furthermore, the user can't raise just the rear of the cover for easy access to cargo.

U.S. Pat. No. 6,227,592 to Thacker and U.S. Pat. No. 6,666,490 to Thacker disclose other mechanisms requiring an electric/hydraulic motor. A front member on each side connects the front of the cover to a mid-point on the bed. A rear member on each side connects the rear of the bed to a mid-point on the cover. A rigid bow runs transversely under the cover to connect the two front members and a second rigid bow runs transversely under the cover to connect the two rear members. A powerful electric hydraulic pump is attached to one member and a switch causes the hydraulic system to raise the entire cover.

This invention is a heavy-duty system but has a number of drawbacks in addition to that of being quite expensive. As the cover is raised, the forward ends of the members move rearward. At maximum height, the cover overhangs the bed by approximately the length of the member, and the front of the bed is exposed an equal amount. And all electric operated lift mechanisms face the following problems: the extra cost of an electric or electric/hydraulic system, the extra cost to install and wire electric motors or hydraulic components, the loss of cargo space in the bed due to mounting of electric motor/hydraulic pump and cylinders, and the inability to raise the cover due to electric motor/hydraulic pump failure or dead battery. Access to cargo is also much slower than manual systems. Furthermore, the user can't raise just the rear of the cover for easy access. In addition the invention is not easily adaptable to the popular inexpensive fiberglass tonneau covers.

U.S. Pat. No. 6,149,220 to Weldy et al. discloses a mechanism comprised of a hinge-slider-lock mechanism at each of 4 corners of a lightweight tonneau cover. A rod is attached at each corner of the bed with its other end sliding in a channel on the bottom of the cover. In operation, the user unlocks both locks at the ends of either a side or the rear of the cover. Then the user manually lifts the chosen side of the lightweight cover. The rods slide to the corner of the cover to support it in the fully raised position.

Although the invention allows easier access to contents located at the front of the bed, it can not raise the entire cover to permit hauling tall cargo because one side must stay attached to the bed. Another problem is that the height of the raised side cannot be adjusted because the cover can only be supported in the fully raised position. Another drawback is the need to unlock two locks every time the cover is raised. Furthermore, the locks are vertically oriented so that lock covers are a practical necessity to prevent water and dirt from falling into the lock assembly and thereby preventing it use.

In addition, this invention can't be used to attach and raise a conventional hard fiberglass tonneau because this type of popular cover is too heavy for most people to manually lift. As noted previously, slider mechanisms are prone to failure due to sand, dirt and ice or snow and denting of the track.

BACKGROUND OF THE INVENTION—OBJECTS AND ADVANTAGES

The objects and advantages of the present invention are to overcome the deficiencies and limitations of the prior art and to produce a mechanism that accomplishes all of the following:

(a) enable a tonneau cover to be manually lifted up from the rear of the bed, pivoting at the front side like popular mechanisms, to gain fast and easy access to contents at the rear portion of the bed, FIG. 2;

(b) enable the user to then easily, quickly and manually raise the front of the cover to approximately the same height as the rear of the cover to permit full access to cargo and so that the cover now forms a raised roof over the vehicle bed, FIG. 3;

(c) enable easy attachment to a vehicle without drilling holes or otherwise permanently modifying the vehicle;

(d) enable the relatively heavy popular composite or fiberglass cover to be easily raised manually;

(e) enable attachment of popular covers whereby production of custom covers is not necessary;

(f) enable attachment of popular covers whereby the invention can be shipped to cover manufacturers for efficient distribution;

(g) enable attachment of popular covers whereby the invention can be inexpensively shipped without the added cost of shipping a large heavy cover;

(h) enable attachment of popular covers whereby the invention can be sold separately from the cover;

(i) enable attachment of the popular covers whereby the invention can be sold to retrofit existing covers;

(j) be comprised of easily manufactured and inexpensive components whereby production is efficient and inexpensive;

(j) be comprised of several basic components easily changed dimensionally whereby the invention is efficiently and inexpensively tailored to the many different size beds of popular vehicle models (k) enable a tonneau cover to be raised at both front and rear and provide sufficient longitudinal and lateral support to permit driving the vehicle while the cover is in the raised position;

(l) enable a tonneau cover to be raised at both front and rear without the expense of electric or hydraulic motor systems, without their costly installation and wiring, without loosing the cargo space they take up; without the problems caused by electric motor failure or a dead battery.

Further object and advantages are provided by additional embodiments comprised of telescoping tube assemblies that enclose and protect a gas-spring from weather and mechanical damage; provide additional longitudinal and lateral support to further enable driving the vehicle while the cover is raised; and enable clamping the mechanism with the cover positioned at any height in its range of travel.

SUMMARY

A mechanism that attaches a hard tonneau cover to a vehicle bed and enables the cover be manually raised at its rear end and then further enables the cover to be manually raised at the front end and supports the cover in the fully raised position. The mechanism requires no outside power and is designed to enable one-hand raising of heavy composite tonneau covers. The mechanism is inexpensive to manufacture, easy to install, and requires no modifications to the vehicle. Another embodiment clamps and holds the cover in any position in its range of travel. Another embodiment uses electric linear actuators on the forward end to provide power-assist in raising the front of the cover.

DRAWINGS—FIGURES

For a fuller understanding of the nature and the objects of the invention, reference should be made to the following detailed description, taken with the accompanying drawings, in which:

FIG. 1A is a side view of a vehicle with a hard tonneau cover with the rearward end and forward end in a lowered position.

FIG. 1B is a perspective view of an illustrative embodiment of the novel Mechanism to Attach and Manually Raise a Tonneau Cover with the rearward end and forward end in a lowered position.

FIG. 2A is a side view of a vehicle with a hard tonneau cover with the rearward end in a raised position and forward end in a lowered position.

FIG. 2B is a perspective view of an illustrative embodiment of the novel Mechanism to Attach and Manually Raise a Tonneau Cover with the rearward end in a raised position and forward end in a lowered position.

FIG. 4A is a perspective view of a telescoping arm.

FIG. 4B is a cut away perspective view of one end of a telescoping arm.

DRAWINGS—REFERENCE NUMERALS

Note: Drawing number suffix L is for Left and R is for Right.
FIGS. 1-3 and FIG. 5

Figure 6:
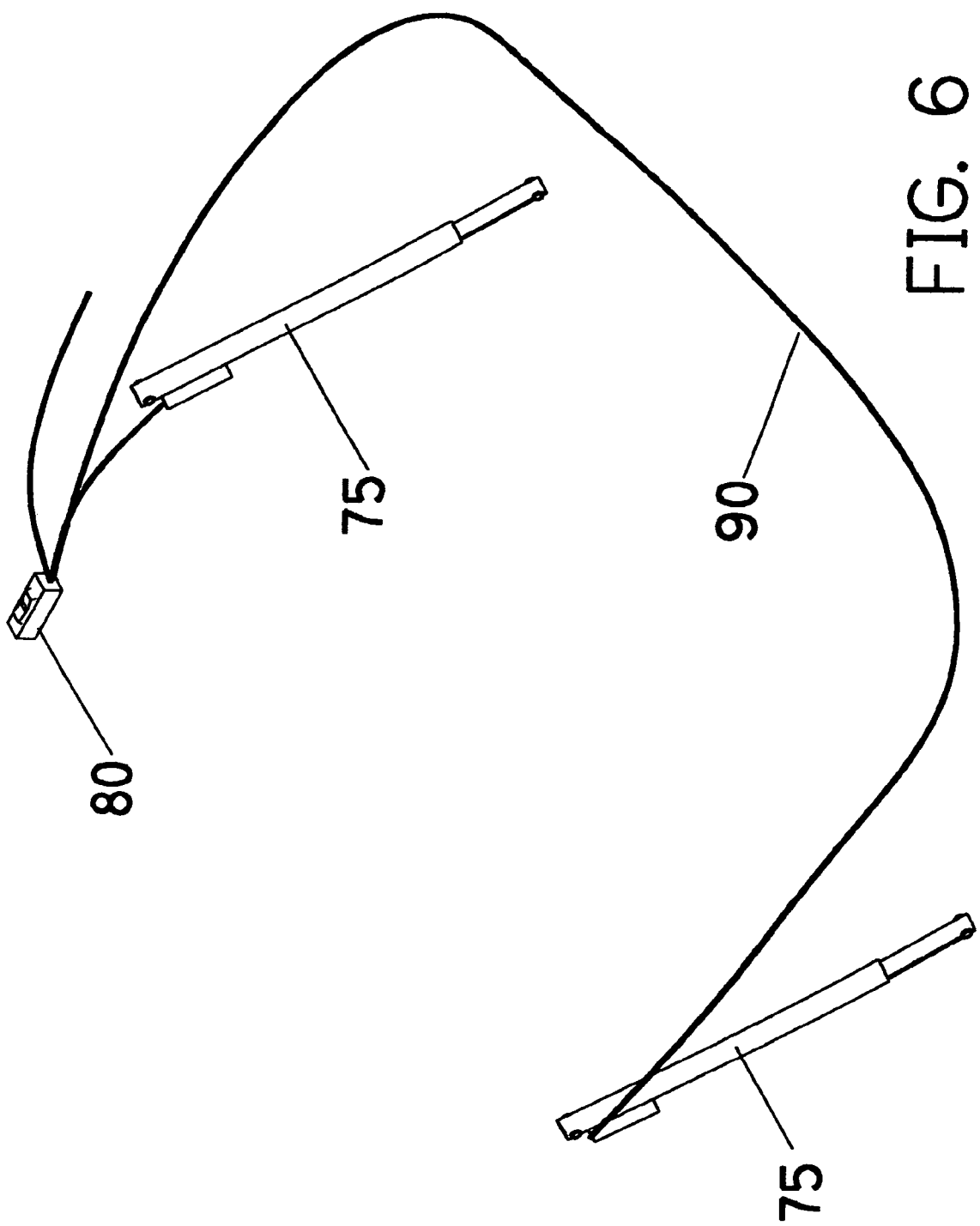
FIG. 6 is a perspective view of components replacing forward telescoping arms in a power-assisted embodiment to raise and lower the front of a hard tonneau cover.

10 side rail
12 side rail pivot bracket
13 rigid arm pivot bracket
15 cross rail
20 hinge means
21 front support bracket
22 bow hinge bracket
23 elongated hole
30 rigid arm
32 arm gusset
35 bow
40 force means
42 rear support bracket
45 rail extension
50 extending arm
55 lowering bracket
60 front latch means
61 latch pin
70 telescoping arm
100 hard cover
200 vehicle bed
   FIG. 4
51 rigid inner tube
52 rigid outer tube
53 gas spring
54 eyelet
56 clamp
57 slot
58 bushing
59 bolt
   FIG. 6
75 linear actuator
80 switch
90 wiring harness

DETAILED DESCRIPTION—FIGS. 1A, 1B

A right side rail (10R) and a left side rail (10L) position the mechanism on the upper surface of the sides of a vehicle bed (200). The side rails are made of rigid elongate material such as angle iron or aluminum and are typically attached by clamps to the topsides of the bed. A hinge means (20) attaches to the front underside of a hard cover (100). A right rigid arm (30R) connects to the right side of the hinge means and a left rigid arm (30L) connects to the left side of the hinge means. The other ends of the right and left rigid arms are pivotally attached respectively to the right and left side rails at about a mid-point. Therefore the rigid arms connect the front of the cover to the side rails and also support the front of the cover a raised position.

FIG. 1A shows a front latch means (60) which secures the forward end of the right rigid arm to the right side rail. Latching can be accomplished by a latch pin (61) attached to the rigid arm and the latch means (60) attached to the said rail. Although the latch means is illustrated on the left side, it could be located on the right side, or the location of the latch pin and latch means could be reversed. Alternately, the latch means can be attached to any structure that is securely attached to the side rails, such as the bed, and to any structure that is securely attached to the forward ends of the arms, such as the front of the cover.

The hinge means is illustrated by a rod extending through the rigid arms but it can be comprised of a piano hinge, a left and a right hinge or four bar hinges.

One end of a force means (40) attaches to the left side rail and the other end attaches to the left rigid arm. The force means is illustrated by a spiral spring assembly but it can be comprised of a gas spring or a torsion bar. Although the force means is illustrated on the left side, it could be located on the right side, or on both left and right sides of the mechanism. The force means creates a biasing force pushing the forward end of the rigid arm upward from the side rail to counter balance the weight of the cover when it is raised.

A right rear extending arm (50R) has an upper end pivotally attached to the right rear end of the cover and a lower end pivotally attached to the right side rail near its rearward end. In the same fashion, an upper end of a left rear extending arm (50L) is pivotally attached to the left rear end of the cover and the lower end is pivotally attached to the left side rail near its rearward end. Therefore the extending arms connect the rear of the cover to the side rails and also support the rear of the cover in a raised position. The extending arm can be comprised of a gas spring, telescoping tube, or a hinged member.

Operation FIGS. 2A, 2B, 3A, 3B

The rear end of the cover is raised by manually lifting the rear edge of the cover. The forward end of the cover pivots on the hinge means (20). The extending arms (50), illustrated in these drawings by gas springs, exert an upward force on the rear of the cover to counter balance its weight. The upward component of the force increases as the gas springs rotate on their side rail attachments and approach a substantially vertical position. The upward component of the force becomes greater than the weight of the rear of the cover when the cover is in the fully raised position, whereby the cover is held in the fully raised position. The present invention is therefore able to provide all of the advantages of the most well-known means of hard tonneau attachment. Raising the rear of the cover for access to cargo is fast, is easy and is the identical procedure that is familiar to majority of owners of hard tonneau covers.

In the next operation, the present invention enables the entire cover to be quickly and easily raised by hand. The front latch (60) is unlatched to enable the front of the cover to be manually raised. As the front of the cover is raised, it is supported by the rigid arms (30) which pivot at their side rail attachment and approach a substantially vertical position. The force means applies a torque between the arms and the side rail to counterbalance the weight of the front of the cover. The force means enables the cover to be easily raised and holds the cover in the fully raised position.

The present invention creates a three-step operation that solves the two major problems of common hard tonneau cover attachment mechanisms by providing access to all the cargo in the bed and enabling the carrying of large cargo such as sofas without removing the cover from the vehicle. In addition, the present invention creates temporary shelter by raising both ends of a hard cover over a vehicle bed.

Lowering the cover is the reverse operation of raising it. The front end of the cover is pulled down until it latches. Then the rear end of the cover is pulled down.

Additional Embodiments FIGS. 4A, 4B

The present invention can be increased in strength by using a telescoping arm illustrated in FIG. 4A as the extending arm and also as the force means. A gas spring (53) is enclosed inside two telescoping tubes. The inside dimension of the outer rigid tube (52) is slightly larger than the outside dimension of the inner rigid tube (51). The end of the outer rigid tube that slides over the inner rigid tube has at least one longitudinal slot (57) that permits that end to be constricted to a smaller diameter. The slotted end also has a clamp (56) that constricts the tube until it has an interference fit with the inner rigid tube. The clamping mechanism is similar to that on the post of a bicycle seat. The clamp enables the assembly to be locked in any position in its range of travel. Furthermore, when the outer rigid tube and the inner rigid tube are clamped tightly, the rigidity of the telescoping arm is greatly increased.

At each end of the telescoping arm illustrated in FIG. 4B a bolt (59) extends through the rigid tube and through an eyelet (54) attached to the gas spring. The gas spring eyelets provide the added advantage of a limit on the range of travel of the telescoping arm. Bushings (58) enable tight clearances and thereby increase rigidity of the telescoping arm at its points of attachment. Bushing material such as nylon reduces rattling and reduces problems from corrosion. An eyelet that has internal threads of the same size as the threaded studs of gas springs enables fast and inexpensive attachment of the eyelet to the gas spring using off-the-shelf parts.

In a preferred embodiment, the outer rigid tube is one-inch schedule 40 aluminum pipe and the inner rigid tube is one-inch stainless steel tubing. These are commonly available standard sizes of tube and pipe and thereby decrease manufacturing costs. These sizes also provide a desirable clearance without additional secondary machining operations. Additionally, stainless steel eliminates the problem of a coating wearing off the outer wear surface of the inner rigid tube. The aluminum pipe enables inexpensive bicycle seat clamps to be used. A clamp that is comprised of a cam lever enables the telescoping arm to be quickly and easily clamped and unclamped.

The inner and outer rigid tubes combine to provide a number of advantages. The gas shock is enclosed and thereby protected from weather, dirt and mechanical damage, including damage to the shaft and denting or deformation of the pressurized gas tube. The inner and outer rigid tubes also completely eliminate side loading on the gas spring and provide a member with far greater tensile strength.

Figure 3A:
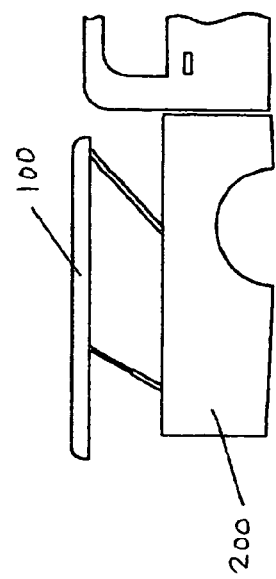
FIG. 3A is a side view of a vehicle with a hard tonneau cover with the rearward end in a raised position and the forward end in a raised position.
Figure 3B:
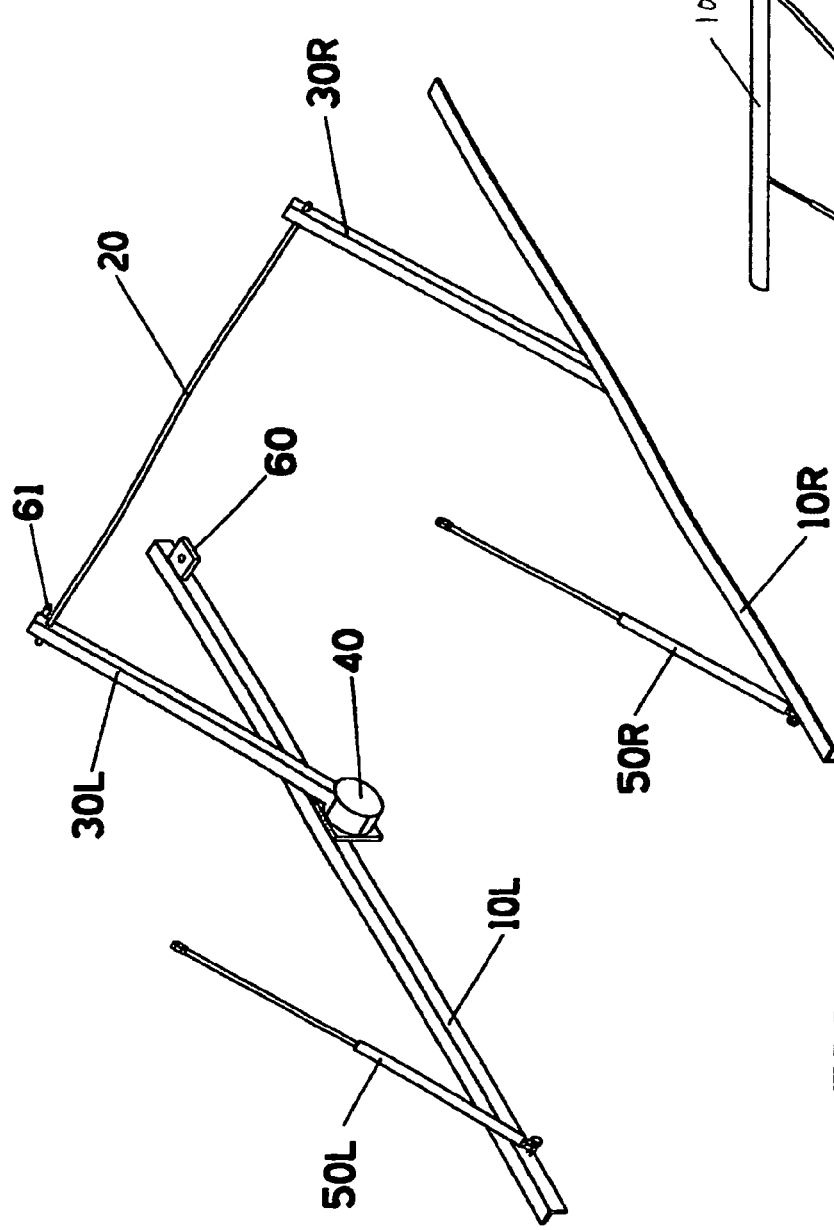
FIG. 3B is a perspective view of an illustrative embodiment of the novel Mechanism to Attach and Manually Raise a Tonneau Cover with the rearward end in a raised position and forward end in a raised position.
Figure 5:
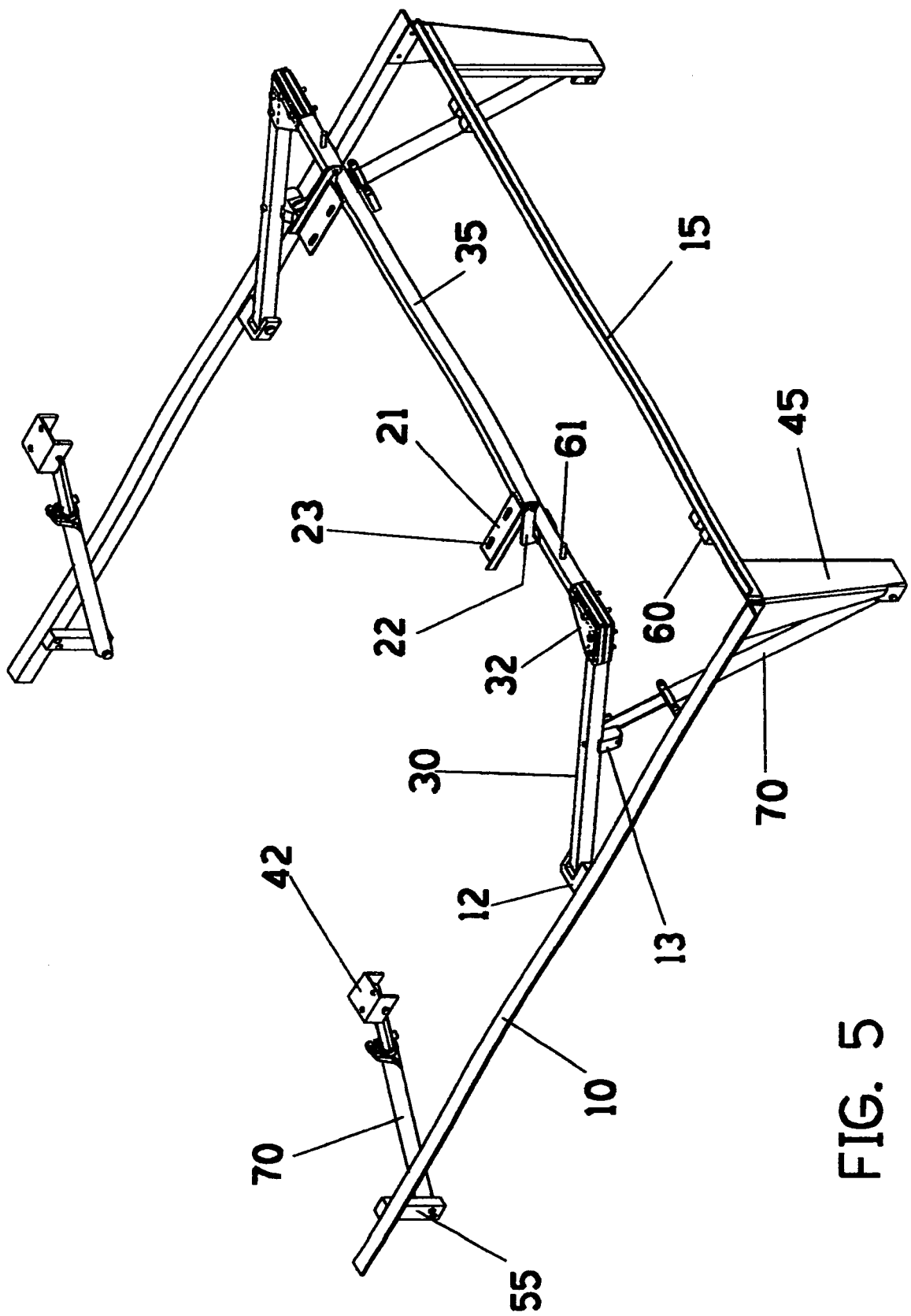
FIG. 5 is a perspective view of another embodiment of the novel Mechanism to Attach and Manually Raise a Tonneau Cover with the rearward end in a partially raised position and forward end in a partially raised position.

Commercial Embodiment FIG. 5

A preferred commercial embodiment of the present invention is illustrated in FIG. 5. A lowering bracket (55) attaches to the side rail (10) whereby the rearward pivot point of the telescoping arm (70) is lower than forward pivot point. Positioning one end of the telescoping assembly lower than the other creates a vertical force component when the cover is in the lowered position that reduces the force required to initially lift the rear of the cover. The bracket can be bolted to the side rails.

A rear support bracket (42) has a planar surface that is greater than 1″ wide that abuts the underside of a hard cover to provide a secure attachment to the cover and to provide strong support of the cover. The forward end of the rear telescoping arm is bolted to the bracket to provide a pivotal attachment.

A cross rail (15) attaches to the forward ends of the side rails. This provides greater strength and stability to the mechanism when installed on a truck bed. In a preferred embodiment, the cross rail is attached to the side rails by bolts. This enables the present invention to be shipped without the side rails attached and therefore the cost of packaging and shipment is substantially less.

A side rail extension (45) is attached to the forward end of the side rail and to the end of the cross rail and extends downward. The side rail extension enables the forward pivot point of the front telescoping arm to be significantly lower than the arm's rearward pivot point. This creates a vertical force component when the cover is in the lowered position that reduces the force required to initially lift the front of the cover. The bracket can be made of a substantially triangular piece of sheet metal, bent in a 90-degree angle to increase rigidity and bolted to the side rail and the cross rail.

A side rail pivot bracket (12) bolts to the side rail to provide a strong attachment for the rigid arm (30) while allowing the rigid arm to pivot. A rigid arm pivot bracket (13) bolts to the rigid arm to provide a strong attachment for the telescoping arm while allowing the telescoping arm to pivot.

A bow (35) is attached to the forward end of the rigid arms with arm gussets (32) for added strength and to permit attachment using fasteners in place of welding. The bow and gussets substantially increase the strength and rigidity of the mechanism when the cover is in a raised position. Alternately, the bow and rigid arms can be comprised of a single continuous rigid member.

A hinge is comprised of a front support bracket (21) that bolts to the cover and a bow hinge bracket (22) that attaches to the bow. The bow hinge bracket extends forward from the bow to make the axis of rotation of the hinge as close to the forward edge of the cover as possible. This geometry prevents the front edge of the cover from moving too far downward when the rear of the cover is raised. A hinge is located near each end of the bow to provide support for the weight of the cover when it is in a raised position and to increase the strength and rigidity of the mechanism when the cover is in a raised position.

The front support brackets have longitudinally elongated attachment holes (23) whereby the fit of the cover to the vehicle can be adjusted forward or backward during installation of the mechanism to compensate for dimensional variation in the bed or cover or to compensate for the additional thickness of an aftermarket installed bed liner or bed coating.

A front latch means (60) secures the bow to the cross rail. When unlatched, the bow can be raised. Incorporating a second front latch means is accomplished by the use of two relay latches, one on the left side of the bow and another on the right side of the bow to provide the advantage of ensuring a close fit and a good seal between the bed and both forward corners of the cover. Latch bolts (61) can be installed on the bow.

A preferred embodiment also includes "C" type clamps to attach the side rails to the truck bed. Less expensive pinch clamps will fall off when they loosen and therefore allow the cover assembly to come off the vehicle. "C" clamps provide added protection if they loosen because they are held in place by the lip on the upper inner surface of the sides of the bed.

The present invention is an improved tonneau cover lifting mechanism that can be customized to fit nearly all vehicle applications by cutting the side rails and bow and cross rail to a different length. Furthermore, the present invention is comprised of components that are all easily replaced by owners in the field, thereby decreasing warranty repair costs and extending the life and value of the mechanism.

Power-assisted Embodiment FIG. 6

A power-assisted embodiment utilizes automated means such as electric linear actuators (75) in place of the forward telescoping arms to provide a powered means of raising and lowering the front end of the tonneau cover when the rear of the cover is in a raised position. The power-assisted embodiment also provides the major advantages of a conventional tonneau cover mechanism, including fast and easy manual raising of the rear of the cover for access to cargo and access to cargo if the battery is dead or the power mechanism fails. In addition it enables very short people or people confined to wheelchairs to easily raise the front of the cover.

The power-assisted embodiment uses the linear actuator's fully extended position to set the fully extended height of the front of the cover. The linear actuators lower the tonneau cover to the truck bed and a limit switch can turn off power to the actuators when the cover reaches the desired position. An alternate means of setting the lowered position of the cover is a height adjustment mechanism at the attachment point of the linear actuator that enables the actuator to lower the cover to the desired position until the actuator's internal limit switch turns off the actuator.

The power-assisted embodiment uses a switch (80) to selectively apply 12 volts to the linear actuators via a wiring harness (90) to move the front of the cover up or down. In the fully retracted position, the linear actuators hold the front of the cover down and thereby eliminate the need for the front latch.

Advantages

The present invention increases the utility and function of the popular hard tonneau cover with a mechanism that is strong, simple to operate, is easily adapted to the many models of vehicles, and is inexpensive to produce and to ship. Numerous prior inventions have attempted to produce these advantages.

Known manually-operated inventions have employed tracks and other mechanisms that are prone to failure in vehicular usage from dirt and dents. Furthermore these inventions either fail to raise the entire cover or fail to supply sufficient mechanical assistance to enable manually raising the popular hard fiberglass body-color painted tonneau covers, and thus are relegated to lightweight blow-molded covers or aluminum covers which have less aesthetic appeal. The known manually-operated inventions also lack the strength to support a hard cover in the raised position while the vehicle is driven.

Known power-operated inventions include heavy-duty systems but all have numerous drawbacks in addition to being quite expensive. All electric-operated lift mechanisms face the following problems: the extra cost of an electric-hydraulic or electric-mechanical system, the extra cost to install and wire electric motors and switches, the loss of cargo space in the bed due to mounting of electric motor/hydraulic pump and cylinders, and the inability to raise the cover due to electric motor/hydraulic pump failure or a dead battery. Furthermore, access to cargo is much slower than manual systems and the user can't raise just the rear of the cover for easy access. In addition the prior art inventions are not easily adaptable to the popular inexpensive fiberglass tonneau covers and their installation typically requires drilling holes in the vehicle for wires and bolts.

The present invention overcomes the limitations of the prior art by providing all of the following advantages which have become clear through the detailed description and the drawings:

(a) enabling a tonneau cover to be manually lifted up from the rear of the bed, pivoting at the front side like popular mechanisms, to gain fast and easy access to contents at the rear portion of the bed;

(b) enabling the user to then easily, quickly and manually raise the front of the cover to approximately the same height as the rear of the cover to permit full access to cargo and so that the cover now forms a raised roof over the vehicle bed;

(c) attaching a multi-position hard cover to a vehicle without drilling holes or otherwise permanently modifying the vehicle;

(d) enabling the relatively heavy popular composite or fiberglass cover to be easily raised manually;

(e) enabling attachment of popular covers whereby production of custom covers is not necessary;

(f) enabling attachment of popular covers whereby the invention can be shipped to cover manufacturers for efficient distribution;

(g) enabling attachment of popular covers whereby the invention can be inexpensively shipped without the added cost of shipping a large heavy cover;

(h) enabling attachment of popular covers whereby the invention can be sold separately from the cover;

(i) enabling attachment of the popular covers whereby the invention can be sold to retrofit existing covers;

(j) being comprised of easily manufactured and inexpensive components whereby production is efficient and inexpensive;

(j) being comprised of several basic components easily changed dimensionally whereby the invention is efficiently and inexpensively tailored to the many different size beds of popular vehicle models (k) enabling a tonneau cover to be raised at both front and rear and provide sufficient longitudinal and lateral support to permit driving the vehicle;

(l) enabling a tonneau cover to be raised at both front and rear without the expense of electric or hydraulic motor systems, without their costly installation and wiring, without loosing the cargo space they take up; without the problems caused by electric motor failure or a dead battery.

Further advantages are provided by additional embodiments comprised of telescoping arms that enclose and protect a gas-spring from weather and mechanical damage; provide additional longitudinal and lateral support to further enable driving the vehicle while the cover is raised; and enable clamping the mechanism with the cover positioned at any height in its range of travel.

A power-assisted embodiment provides the advantage of enabling very short people or people confined to wheelchairs to easily raise the front of the cover. The power-assisted embodiment also provides the major advantages of a conventional tonneau cover mechanism, including fast and easy raising of the rear of the cover for access to cargo and access to cargo if the battery is dead or the power mechanism fails.

The present invention is clearly new and useful. Moreover, it was not obvious to those of ordinary skill in the art at the time it was made.

It will thus be seen that the objects set forth above, and those made apparent from the foregoing description, are efficiently attended. Since certain changes may be made in the foregoing construction without departing from the scope of the invention, it is intended that all matters contained in the foregoing construction or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

Now that the invention has been disclosed,
We claim:

1. A mechanism for attaching a hard cover to a vehicle bed and for raising the rear of the hard cover and for subsequently raising the front of the hard cover, comprising:
   (a) a right side rail,
   (b) a left side rail,
   (c) a right rear extending arm, one end pivotally attached to a rear-point of said right side rail and other end pivotally attached to the right rear of the hard cover, (d) a left rear extending arm, one end pivotally attached to a rear-point of said left side rail and other end pivotally attached to the left rear of the hard cover, (e) a hinge means attached to the forward end of the hard cover, (f) a right rigid arm, having a forward end attached to said hinge means and a rearward end pivotally attached to said right side rail near a mid-point, (g) a left rigid arm, having a forward end attached to said hinge means and a rearward end pivotally attached to said left side rail near a mid-point, (h) a force means, one end attached to said right rigid arm and the other end attached to said right side rail wherein said force means provides torque to raise the forward end of said right rigid arm above said right side rail, or one end attached to said left rigid arm and the other end attached to said left side rail wherein said force means provides torque to raise the forward end of said left rigid arm above said left side rail, and (i) a front latch means connecting the forward end of said right rigid arm to said right side rail, or connecting the forward end of said left rigid arm to said left side rail.

2. The mechanism of claim 1 wherein said rear extending arms are gas springs.

3. The mechanism of claim 1 wherein said force means is a gas spring.

4. The mechanism of claim 1, including a bow attached to said hinge means for holding said right rigid arm and said left rigid arm in a substantially horizontal position.

5. A mechanism for attaching a hard cover to a vehicle bed and for raising the rear of the hard cover and for subsequently raising the front of the hard cover, comprising:

(a) a right side rail, (b) a left side rail, (c) a right rear telescoping arm, one end pivotally attached to a rear-point of said right side rail and other end pivotally attached to the right rear of the hard cover, (d) a left rear telescoping arm, one end pivotally attached to a rear-point of said left side rail and other end pivotally attached to the left rear of the hard cover, (e) a hinge means attached to the forward end of the hard cover, (f) a bow attached to said hinge means, (g) a right rigid arm, having a forward end attached to the right end of said bow and a rearward end pivotally attached to said right side rail near a mid-point, (h) a left rigid arm, having a forward end attached to the left end of said bow and a rearward end pivotally attached to said left side rail near a mid-point, (i) a right side rail extension attached at the forward end of said right rail and extending downward at a substantially right angle, (j) a left side rail extension attached at the forward end of said left rail and extending downward at a substantially right angle, (k) a right front telescoping arm, one end pivotally attached to the lower end of said right side rail extension and other end pivotally attached to said right rigid arm at a mid-point, (l) a left front telescoping arm, one end pivotally attached to the lower end of said left side rail extension and other end pivotally attached to said left rigid and at a midpoint, and (m) a front latch means attached to said bow member wherein said front latch means releasebly secures said bow holding said right rigid arm and said left rigid arm in a substantially horizontal position.

6. The mechanism of claim 5 wherein said telescoping arm is comprised of (a) a gas spring, (b) an outer rigid tube, an inner rigid tube, and (c) a clamp means wherein one end of said outer rigid tube is releaseably clamped onto said inner rigid tube.

7. The mechanism of claim 6 further including eyelets attached to the ends of said gas spring whereby the maximum range of travel of the telescoping arm can be limited and whereby the height of a hard cover is tethered for safety.

8. The mechanism of claim 7 wherein said eyelets have internal threads whereby they can be quickly and inexpensively attached to said gas spring.

9. The mechanism of claim 6 further including a plurality of flange bushings inserted in said outer rigid tube and said inner rigid tube whereby the attachment of said telescoping tube can be made more durable, less prone to corrosion, and less likely to rattle.

10. The mechanism of claim 5 further including a cross rail, one end of which is attached to the forward end of said right side rail and the other end attached to the forward end of said left side rail.

11. The mechanism of claim 10 wherein a component of said front latch means is attached to said cross rail.

12. The mechanism of claim 10 further including a second front latch means, said second front latch means attached near the right end of said cross rail, and the other said front latch means attached near the left end of said cross rail.

13. The mechanism of claim 5 further comprising (a) a right rear support bracket attached near the right rear corner of the hard cover and (b) a left rear support bracket attached near the left rear corner of the hard cover, wherein said right rear support bracket and said left rear support bracket become part of a hard cover and said right and left rear telescoping arms are pivotally attached to the rear of the hard cover by said rear support brackets, and said rear support brackets have a surface contacting a hard cover that is greater than 1 inch wide whereby greater lateral support of the hard cover is provided.

14. The mechanism of claim 5 further including a plurality of lowering brackets, wherein said right and left rear telescoping arms are pivotally attached respectively to said right and left side rails by said lowering brackets.

15. The mechanism of claim 5 further including arm gussets wherein said arm gussets strengthen the attachment of the ends of said bow to the forward end of said right rigid arm and said left rigid arm.

16. The mechanism of claim 5 wherein said right rigid arm, said left rigid arm and said bow is comprised of a single continuous rigid member.

17. The mechanism of claim 5 wherein said hinge means is comprised of (a) a right front support bracket, said right front support bracket attached near the right forward side of the hard cover and (b) a left front support bracket, said left front support bracket attached near the left forward side of the hard cover, and (c) a right bow hinge bracket, said right bow hinge bracket attached near the right side of said bow and (d) a left bow hinge bracket, said left bow hinge bracket attached near the left side of said bow, whereby said right front support bracket is pivotally attached to said right bow hinge bracket and said left front support bracket is pivotally attached to said left bow hinge bracket.

18. The mechanism of claim 17 wherein said right front support bracket and said left front support bracket have longitudinally elongated attachment holes whereby the fit of the hard cover to the vehicle bed can be adjusted forward or backward during installation to compensate for dimensional variation in the vehicle bed and the hard cover or to compensate for aftermarket-installed bed liners or bed coatings.

19. A mechanism for attaching a hard cover to a vehicle bed and for raising the rear of the hard cover and for subsequently raising the front of the hard cover, comprising:
  (a) a right side rail,
  (b) a left side rail,
  (c) a right rear telescoping arm, one end pivotally attached to a rear-point of said right side rail and other end pivotally attached to the right rear of the hard cover,
  (d) a left rear telescoping arm, one end pivotally attached to a rear-point of said left side rail and other end pivotally attached to the left rear of the hard cover,
  (e) a hinge means attached to the forward end of the hard cover,
  (f) a bow attached to said hinge means
  (g) a right rigid arm, having a forward end attached to the right end of said bow and a rearward end pivotally attached to said right side rail near a mid-point,
  (h) a left rigid arm, having a forward end attached to the left end of said bow and a rearward end pivotally attached to said left side rail near a mid-point,
  (i) a right side rail extension attached at the forward end of said right rail and extending downward at a substantially right angle,
  (j) a left side rail extension attached at the forward end of said left rail and extending downward at a substantially right angle,
  (k) a right front linear actuator, one end pivotally attached to the lower end of said right side rail extension and other end pivotally attached to said right arm at a midpoint,
  (l) a left front linear actuator, one end pivotally attached to the lower end of said left side rail extension and other end pivotally attached to said left arm at a midpoint,
  (m) a switch, and
  (n) a wiring harness that electrically connects 12 volt power from a vehicle to said switch and from said switch to said linear actuators.

20. A method of manually raising a hard cover over a vehicle bed, the hard cover attached to the vehicle bed with a mechanism including a right side rail; a left side rail; a right rear extending arm, one end pivotally attached to a rear-point of said right side rail and other end pivotally attached to the right rear of the hard cover; a left rear extending arm, one end pivotally attached to a rear-point of said left side rail and other end pivotally attached to the left rear of the hard cover; a hinge means attached to the forward end of the hard cover; a right rigid arm, having a forward end attached to said hinge means and a rearward end pivotally attached to said right side rail near a mid-point; a left rigid arm, having a forward end attached to said hinge means and a rearward end pivotally attached to said left side rail near a mid-point; a force means, one end attached to said right rigid arm and the other end attached to said right side rail wherein said force means provides torgue to raise the forward end of said right rigid arm above said right side rail, or one end attached to said left rigid arm and the other end attached to said left side rail wherein said force means provides torgue to raise the forward end of said left rigid arm above said left side rail; and a front latch means connecting the forward end of said right rigid arm to said right side rail, or connecting the forward end of said left rigid arm to said left side rail, the method comprising the steps of:
  (a) manually raising the rearward end of the hard cover by applying pressure upward on the rearward end of the hard cover until the extending arms extend and support the rearward end of said cover in a raised position, and
  (b) raising the forward end of the hard cover until the rigid arms pivot upward and support the forward end of the hard cover at the hinge means in a raised position.

21. The method of claim 20 wherein the step of raising the forward end of the hard cover is further comprised of the steps of
  (a) unlatching the forward end of the hard cover, and
  (b) manually raising the forward end of the hard cover by applying pressure upward on the forward end of the hard cover.

22. The method of claim 20 wherein the step of raising the forward end of the hard cover is by automated means.

23. The method of claim 20 further comprising the step of clamping said extending arms whereby said extending arms effectively become rigid arms holding the hard cover in a chosen position in its range of travel and increasing the strength of the support provided to the hard cover by said extending arms.

* * * * *